US009306261B2

(12) United States Patent
Henrie et al.

(10) Patent No.: US 9,306,261 B2
(45) Date of Patent: Apr. 5, 2016

(54) MAGNETIC FIELD SYSTEM AND METHOD FOR MITIGATING PASSIVE INTERMODULATION DISTORTION

(75) Inventors: Justin J. Henrie, Camarillo, CA (US); Andrew Christianson, Bloomington, IN (US); William J. Chappell, Lafayette, IN (US)

(73) Assignee: PURDUE RESEARCH FOUNDATION, West Lafayette, IN (US)

(*) Notice: Subject to any disclaimer, the term of this patent is extended or adjusted under 35 U.S.C. 154(b) by 904 days.

(21) Appl. No.: 13/376,348

(22) PCT Filed: Jun. 4, 2010

(86) PCT No.: PCT/US2010/037465
§ 371 (c)(1),
(2), (4) Date: Feb. 21, 2012

(87) PCT Pub. No.: WO2010/141860
PCT Pub. Date: Dec. 9, 2010

(65) Prior Publication Data

US 2012/0139656 A1 Jun. 7, 2012

Related U.S. Application Data

(60) Provisional application No. 61/184,153, filed on Jun. 4, 2009, provisional application No. 61/244,754, filed on Sep. 22, 2009.

(51) Int. Cl.

| | |
|---|---|
| ***H04B 3/28*** | (2006.01) |
| ***H01P 5/02*** | (2006.01) |
| *H01F 7/02* | (2006.01) |
| *H01R 13/7193* | (2011.01) |

(52) U.S. Cl.
CPC ................ *H01P 5/026* (2013.01); *H01P 5/028* (2013.01); *H01F 7/0273* (2013.01); *H01R 13/7193* (2013.01)

(58) Field of Classification Search
CPC ....... H01P 5/026; H01P 5/028; H01F 7/0273; H01R 13/7193
USPC ........................................................... 333/12
See application file for complete search history.

(56) References Cited

U.S. PATENT DOCUMENTS

| | | | | |
|---|---|---|---|---|
| 4,156,857 | A * | 5/1979 | Silence et al. | 333/12 |
| 4,361,375 | A | 11/1982 | Bailey et al. | |
| 4,972,167 | A | 11/1990 | Fujioka | |
| 5,074,809 | A | 12/1991 | Rousseau | |
| 5,334,955 | A | 8/1994 | Strnad | |
| 7,335,059 | B2 | 2/2008 | Vaccaro | |
| 2002/0046868 | A1 | 4/2002 | Borg et al. | |

(Continued)

OTHER PUBLICATIONS

Lui, P., "Passive Intermodulation Interference in Communication Systems," *Electronics & Communication Engineering Journal*, vol. 2, Jun. 1990, pp. 109-118.

(Continued)

*Primary Examiner* — Robert Pascal
*Assistant Examiner* — Kimberly Glenn
(74) *Attorney, Agent, or Firm* — Purdue Research Foundation

(57) ABSTRACT

A magnetic field method for mitigating passive intermodulation distortion. The method is useful both for mitigating passive intermodulation and for easily locating dominant sources of it, even in shielded components.

4 Claims, 6 Drawing Sheets

(56) References Cited

U.S. PATENT DOCUMENTS

| | | | | |
|---|---|---|---|---|
| 2003/0019653 | A1 * | 1/2003 | Kuga et al. | 174/68.1 |
| 2003/0030591 | A1 | 2/2003 | Gipson et al. | |
| 2006/0232354 | A1 | 10/2006 | Gilliland | |

OTHER PUBLICATIONS

Abuelma'atti, M., "Prediction of Passive Intermodulation Arising From Corrosion," *IEE Proceedings—Science, Measurement and Technology*, vol. 150, No. 1, Jan. 6, 2003, pp. 30-34.

Arazm, F., "Nonlinearities in Metal Contacts at Microwave Frequencies," *IEEE Transactions on Electromagnetic Compatibility*, vol. EMC-22, No. 3, Aug. 1980, pp. 142-149.

Wilcox, J. et al., "Thermal Heating Contribution to Intermodulation Fields in Coaxial Waveguides," *IEEE Transactions on Communications*, vol. 24, No. 2, Feb. 1976, pp. 238-243.

Christianson, A. et al., "Higher Order Intermodulation Product Measurement of Passive Components," *IEEE Transactions on Microwave Theory and Techniques*, vol. 56, No. 7, Jul. 2008, pp. 1729-1736.

Henrie, J. et al., "Prediction of Passive Intermodulation From Coaxial Connectors in Microwave Networks," *IEEE Transactions on Microwave Theory and Techniques*, vol. 56, No. 1, Jan. 2008, pp. 209-216.

Panina, L.V. et al., "Giant Magneto-Impedance and Magnet-Inductive Effects in Amorphous Alloys (Invited)," *Journal of Applied Physics*, vol. 76, No. 10, Nov. 15, 1994, pp. 6198-6203.

Henrie, J. et al., "Linear-Nonlinear Interaction's Effect on the Power Dependence of Nonlinear Distortion Products," *Applied Physics Letters*, vol. 94, No. 11, Mar. 19, 2009, pp. 114101-1-114101-3, 2009.

Christianson, A. et al., "Measurement of Ultra Low Passive Intermodulation with Ability to Separate Current/Voltage Induced Nonlinearities," *2009 IEEE MTT-S International Microwave Symposium Digest*, Jun. 7-12, 2009, Boston, MA, pp. 1301-1304.

Henrie, J. et al., "Cancellation of Passive Intermodulation Distortion in Microwave Networks," *Proceedings of the 38th European Microwave Conference*, Amsterdam, The Netherlands, Oct. 27-31, 2008, pp. 1153-1156.

International Search Report and Written Opinion, dated Oct. 5, 2010, in PCT Application No. PCT/US2010/037465, 11 pgs.

International Preliminary Report on Patentability, dated Dec. 6, 2011, in in PCT Application No. PCT/US2010/037465, 7 pgs.

Summitek Instruments Data Sheet, "Passive Intermodulation Analyzers—D Configuration," © 2008, 10 pgs.

Wilkerson, J. R. et al., "Electro-Thermal Theory of Intermodulation Distortion in Lossy Microwave Components," *IEEE Trans. on Microwave Theory and Tech.*, vol. 56, No. 12, Dec. 2008, pp. 2717-2725.

Bond, C. et al., "Intermodulation Generation by Electron Tunneling Through Aluminum-Oxide Films," *Proc. of the IEEE*, vol. 67, No. 12, Dec. 1979, pp. 1643-1652.

Bailey, G. C. et al., "A Study of RF Nonlinearities in Nickel," *Journal of Applied Physics*, vol. 50, No. 1, 1979, pp. 453-461.

Deats, B. et al., "Measuring the Passive-IM Performance of RF Cable Assemblies," *Microwave and RF*, vol. 36, No. 3, Mar. 1997, 5 pgs.

D. Zelenchuk, D. et al., "Passive Intermodulation in Finite Lengths of Printed Microstrip Lines," *IEEE Transactions on Microwave Theory and Techniques*, vol. 56, No. 11, Nov. 2008, pp. 2426-2434.

* cited by examiner

MAGNETIC FIELD SYSTEM AND METHOD FOR MITIGATING PASSIVE INTERMODULATION DISTORTION

CROSS-REFERENCE TO RELATED APPLICATIONS

This application claims the benefit of Provisional Patent Application Nos. 61/184,153, filed Jun. 4, 2009, and 61/244,754, filed Sep. 22, 2009, which applications are hereby incorporated by reference along with all references cited therein.

BACKGROUND OF THE INVENTION

Passive intermodulation (PIM) is a form of nonlinear distortion that is encountered in a growing number of communications and sensing systems. This distortion is created in passive RF system components such as coaxial connectors, antennas and filters as a result of small nonlinear characteristics of such passive components, and frequently transfers energy from high-power transmit signals to frequencies within the system's receive band, masking low-level receive signals or even saturating sensitive receive circuitry. See, for example, P. L. Lui, "Passive Intermodulation Interference in Communication Systems," *Electronics & Communication Engineering Journal*, Vol. 2, June 1990, pp. 109-118. This reference is incorporated herein by reference along with all other references cited herein. Because the distortion products are generated after low-level receive signals are already present in the network, the distortion power cannot be removed by filters and arrives at the receiver along with the desired receive signals.

As a result of the great difference in power between transmitted and receive signals in a communication system, passive intermodulation distortion levels as low as −150 dBc are potentially problematic sources of interference in many systems as the nonlinearity of passive components causes power at transmit frequencies to mix into the system's receive band. Passive intermodulation is most problematic in transmit/receive systems where transmit and receive bands are closely spaced. Communication frequency bands are becoming more densely populated, making passive intermodulation a growing concern in the wireless community, cell phone applications representing one example.

Because PIM distortion cannot usually be mitigated by conventional means such as frequency filtering, many studies have been undertaken to identify the causes of PIM. See, for example, the above-referenced paper by Lui as well as the following papers: M. T. Abuelma'atti, "Prediction of Passive Intermodulation Arising From Corrosion," *IEE Proceedings, Science, Measurement and Technology*, Vol. 150, No. 1, 2003, pp. 30-34; F. Arazm, "Nonlinearities in Metal Contacts at Microwave Frequencies," *IEEE Transactions on Electromagnetic Compatibility*, Vol. EMC-22, August 1980, pp. 142-149; and J. Wilcox and P. Molmud, "Thermal Heating Contribution to Intermodulation Fields in Coaxial Waveguides," *IEEE Transactions on Communications*, Vol. 24, No. 2, February 1976, pp. 238-243. PIM is known to occur at junctions of dissimilar metals and at junctions of metals and oxides. The unsoldered metal-metal junction in a coaxial connector is a major contributor to PIM in many microwave networks. Ferromagnetic conduction metals such as iron or nickel are also well known causes of PIM distortion, especially in coaxial connectors. See, for example, the above-referenced paper by Lui as well as the following references: J. Henrie, A. Christianson, and W. J. Chappell, "Prediction of Passive Intermodulation From Coaxial Connectors in Microwave Networks," *IEEE Transactions on Microwave Theory and Techniques*, Vol. 56, No. 1, January 2008, pp. 209-216; and J. C. Pedro and N. B. Carvalho, *Intermodulation Distortion In Microwave And Wireless Circuits*, Artech House, Boston, Mass., 2003. As a result, efforts have been made to solve the problem through the choice of contact materials, including combinations of base material and plating. For example, low-PIM connectors are available in which the contacts are silver-plated or gold-plated with no nickel undercoat. However, there are tradeoffs with such connectors, most notably a higher cost of materials and manufacturing, and a shorter lifetime in some cases, in exchange for the lower PIM. Low PIM connectors are relatively expensive, bulky, low-bandwidth, and more susceptible to some environmental factors because of their composition. In addition, a need exists for even lower PIM in coaxial connectors and other passive RF components.

SUMMARY OF THE INVENTION

The present invention uses a magnetic field to mitigate passive intermodulation distortion (PIM). A preferably strong external static magnetic field is used to significantly lower the intermodulation distortion produced by wireless components which contain ferromagnetic materials such as nickel or steel. The method is useful for mitigating PIM and for locating sources of PIM.

The objects and advantages of the present invention will be more apparent upon reading the following detailed description in conjunction with the accompanying drawings.

DESCRIPTION OF PREFERRED EMBODIMENTS

Figure 1:
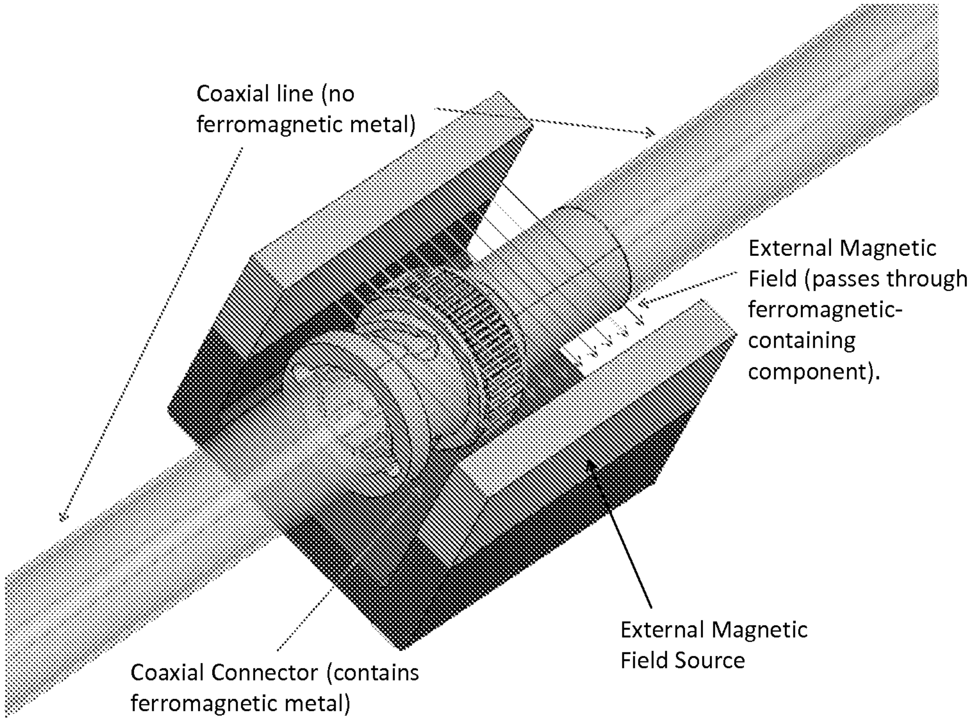
FIG. 1 depicts a first embodiment of a magnetic PIM mitigation system according to the present invention, the first embodiment having an external magnetic field source around a nickel-containing BNC connector.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

FIG. 1 depicts a first embodiment of the present invention in which a strong external static magnetic field is applied to a nickel-containing BNC connector, producing magnetic "biasing" of the connector and reducing the PIM produced by the connector. The external magnetic field reduces the series resistance and internal inductance of the connector.

Figure 2:
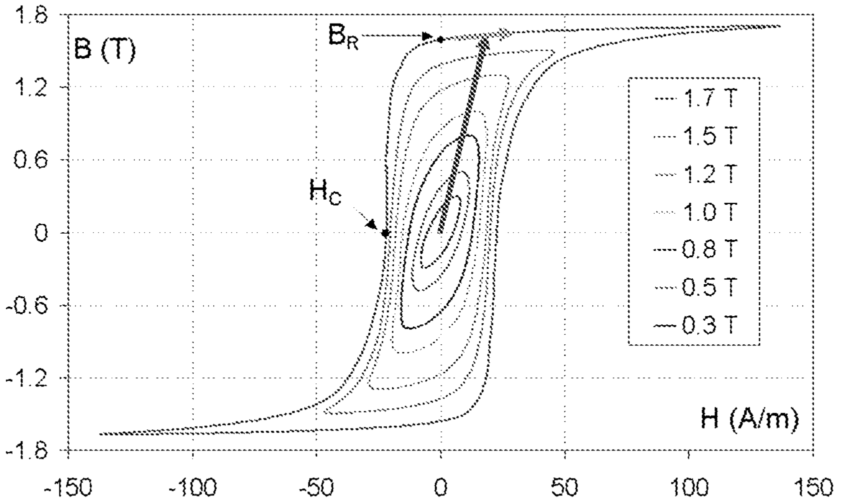
FIG. 2 is a B-H curve illustrating the nonlinear relationship between the magnetization of a ferromagnetic material and an imposed magnetic field.

Although not extensively studied in terms of intermodulation distortion (IM) generation, it is well known that components which contain ferromagnetic materials in their conduction paths generate high levels of IM. See, for example, the above-referenced paper by Lui, as well as the following references: J. Henrie, A. Christianson, and W. J. Chappell, "Prediction of Passive Intermodulation From Coaxial Connectors in Microwave Networks," *IEEE Transactions on Microwave Theory and Techniques*, Vol. 56, January 2008, pp. 209-216; and J. C. Pedro and N. B. Carvalho, *Intermodulation Distortion In Microwave And Wireless Circuits*, Artech House, Boston, Mass., 2003. The cause of this nonlinearity is believed to be the hysteretic relationship between the magnetization of a ferromagnetic material and any imposed magnetic field, such as that caused by current flow through the conductor. The relationship is represented graphically as a nonlinear, sigmoid-shaped B-H curve such as shown in FIG. 2.

It has been found, however, that the introduction of an external magnetic field can partially or fully saturate the magnetization of a ferromagnetic metal. This has the effect of decreasing the effective magnetic permeability of the material, lowering the real and imaginary parts of the impedance of the metal. This lowering of impedance due to an external magnetic field is known as magneto-impedance. In linear tests, the change is very small, but it can have a profound impact on the nonlinear behavior of the system.

One embodiment of the present invention applies an external magnetic field to gold-plated SMA (sub-miniature A) connectors, whose nickel underplate layer displays the magneto-impedance phenomenon. In one example, shown in FIG. 3A, an SMA connector was placed at a maximum-current point of a capacitively coupled two-port microstrip resonator. In this half-wavelength resonator, the capacitances of the large square copper regions on either side of the network serve as low-impedance coupling sections. This type of coupling creates current maxima at each end of the resonator. The middle section of the resonator is a 50 Ω transmission line. A magnetic field is applied to the SMA connector using a neodymium rare-earth magnet, part number DZ0Y0 from K&J Magnetics, as a magnetic field source. The field at the SMA connector is measured with an F. W. Bell Model 5180 Gauss Meter. FIG. 3B displays the variation of the input reflection coefficient (the $S_{11}$ parameter) and transmission coefficient (the $S_{21}$ parameter) at the center frequency of the microwave resonator as a function of an external magnetic field.

The external magnetic field also causes a shift of the resonant frequency of the resonator (from 465.8 to 466.1 MHz in this example). FIG. 3C shows the $S_{11}$ parameter of the resonator both with and without the imposition of a 275 mT external magnetic field to the SMA connection. The behavior of the resonator is consistent with a decrease in the resistance and a reduction in reactance. The unloaded Q increases, which indicates less resistance in the resonator. The shift in frequency indicates a reduction in the connector's inductance.

The inventors have found that by appropriately accounting for the interaction between linear and nonlinear components in a system, circuit models of PIM-producing networks can be constructed by modeling passive nonlinear components such as coaxial connectors as simple third-order nonlinear resistors. These models can be very accurate across broad power ranges and network topologies. Further information regarding these models is contained in the following paper by J. Henrie, A. Christianson, and W. J. Chappell: "Linear-Nonlinear Interaction's Effect on the Power Dependence of Nonlinear Distortion Products," *Applied Physics Letters*, Vol. 94, March 2009, pp. 114101-1-114101-3. These models can be easily implemented using circuit simulators, allowing one to simulate both the linear and nonlinear properties of PIM-producing networks under the same framework.

Figure 3A:
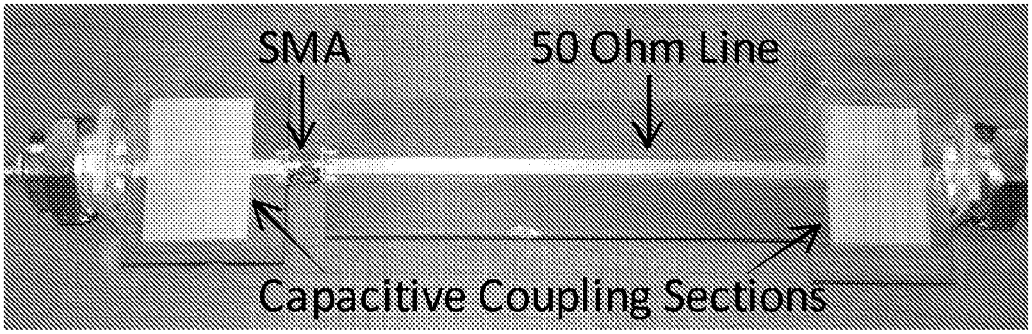
FIG. 3A is a photograph of a capacitively coupled microstrip resonator with an SMA connector placed at a maximum-current point.
Figure 3B:
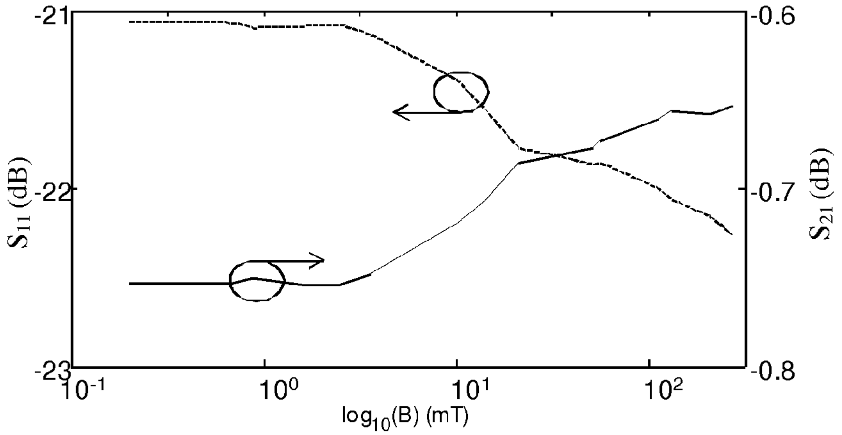
FIG. 3B is a graph of the variation in the reflection coefficient of the resonator of FIG. 3A as a function of DC magnetic field applied to the embedded SMA connector.
Figure 3C:
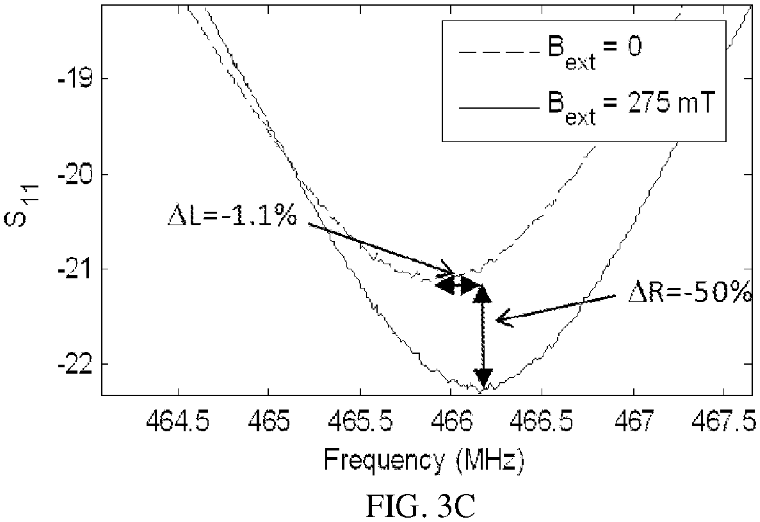
FIG. 3C shows the shift in frequency and insertion loss of the resonator of FIG. 3A resulting from a DC magnetic field applied to the embedded SMA connector.

Based on such a SPICE model of the microstrip resonator shown in FIG. 3A, the inventors calculated that the resistance of the connector drops by 52 milliohms under the applied magnetic field. In addition, the inductance of the connector was reduced by 0.04 nanohenries as a consequence of magneto-impedance, which was evinced by a shift of the center frequency of the resonator before and after the introduction of the external magnetic field.

An Agilent ADS model of the resonator of FIG. 3A with circuit-simulator microstrip elements (ADS MLIN elements) was also employed to numerically extract the values of the changes in resistance and reactance. To model the presence of the embedded coaxial connector, a small length of ideal transmission line is added, plus a small series resistance and inductance to account for the changes in the connection's resistance and inductance due to the presence of the external magnetic field. The series resistance of the connector drops from 160 to 79 milliohms (a 50% reduction) under the applied magnetic field. In addition, the inductance of the connector was reduced by 3 nanohenries/m (a 1.1% reduction in inductance per unit length). The reduction in the series resistance and inductance of the SMA connection is consistent with a significant reduction in the magnetic permeability of the nickel underplate layer, caused by the strong external magnetic field.

Figure 5:
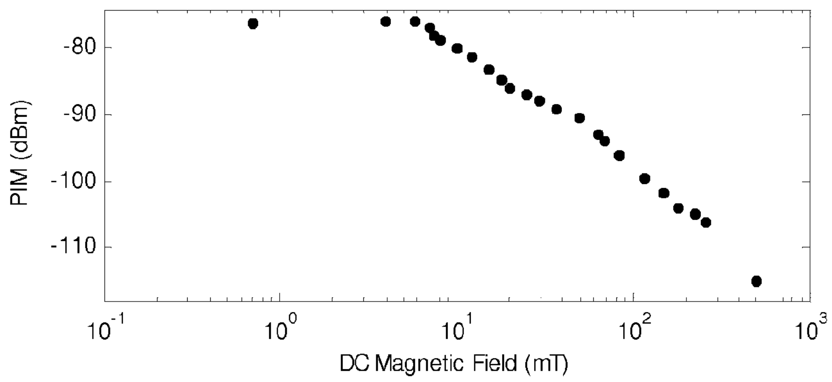
FIG. 5 is a plot of the PIM output of an SMA connector as a function of external magnetic field in a 2-tone test, and shows a 40 dB reduction in IM magnitude from the original value when the SMA connector is subjected to a 500 mT external magnetic field.

The magnetoimpedance phenomenon results in only small changes in the linear behavior of the connector, and for that reason the connector is embedded in the resonator of FIG. 3A in order to detect the changes more clearly. However, the introduction of the magnetic field causes much more dramatic results in the PIM output of the connector, even in a through-line (non-resonant) scenario, as shown in FIG. 5, which is discussed below.

Figure 4A:
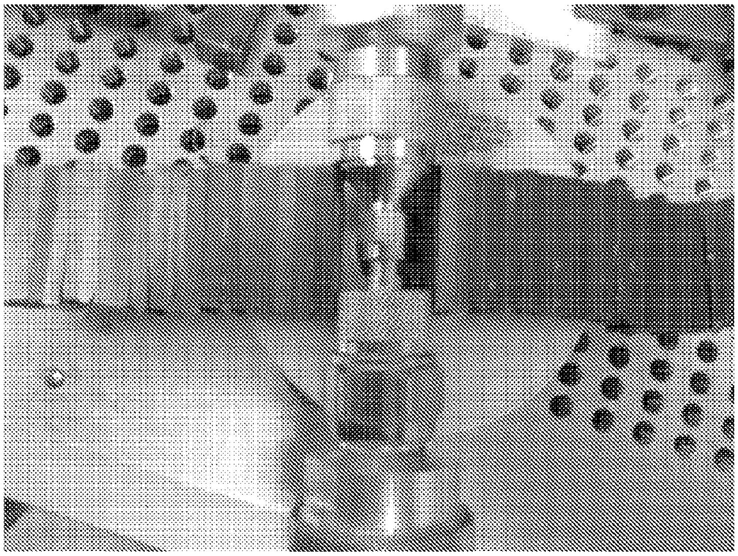
FIG. 4A is a photograph of a prototype magnetic field source constructed with multiple rare-earth magnets on each side of an SMA connector.
Figure 4B:
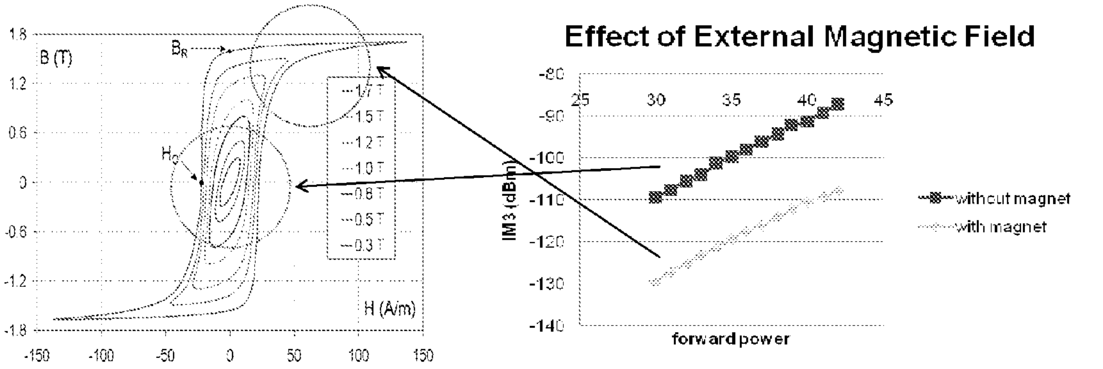
FIG. 4B shows the effect of the external magnetic field in relation to the B-H curve.

Referring to FIG. 4A, a prototype magnetic field source was constructed with rare-earth magnets on each side of an SMA connector as shown. FIG. 4B shows the effect of the magnetic field in relation to the B-H curve. The PIM distortion diminishes as the number of the permanent magnets beside the coaxial connection is increased. 14 total magnets (7 on each side) gave a maximum PIM mitigation of 30 dB with the prototype; adding more magnets did not appreciably lower the PIM level.

Because the static magnetic field causes a drop in the resistance of the ferromagnetic component, less power is absorbed by the component and less IM distortion is produced. Another way in which the external magnetic field serves to mitigate the nonlinearity of the ferromagnetic material is by direct linearization of the permeability, as seen in FIG. 1 of a paper by L. V. Panina, K. Mohri, K. Bushida, and M. Noda entitled "Giant Magneto-Impedance and Magneto-Inductive Effects in Amorphous Alloys," published in the *Journal of Applied Physics*, Vol. 76, No. 10, November 1994, pp. 6198-6203.

Both of these mechanisms—the lowering of resistance and the linearization of magnetic permeability of the nickel underplate metal—combine to dramatically decrease the PIM output of the connector. As an example, FIG. 5 plots the PIM output of an SMA connector in a 2×43 dBm forward power 2-tone test. After a threshold value of external magnetic field is reached, PIM produced by the SMA connector decreases monotonically with increasing magnetic field, at a rate of about 20 dB of PIM reduction per order-of-magnitude increase in magnetic field. An applied field of 500 mT produced approximately 40 dB (39 dB) of diminution in the PIM output of the SMA connector. This measurement was made with a Summitek Instruments SI-400C Passive Intermodulation Analyzer. In both this and the previously described experiment (FIG. 3), the SMA connection was formed by the mating of Pasternack Enterprises PE4543 and PE4913 coax-to-planar adapters. Other than the SMA adapters, all test elements were low-PIM components. The two high-powered carrier tones were at 463 and 468 MHz, and the measured third-order passive intermodulation was at 458 MHz. A more detailed discussion of the experimental setup can be found in the following paper: A. Christianson and W. J. Chappell, "Measurement of Ultra Low Passive Intermodulation with Ability to Separate Current/Voltage Induced Nonlinearities," in *IEEE Microwave Theory and Techniques Society International Microwave Symposium*, Jun. 7-12, 2009, Boston, Mass., pp. 1301-1304.

Because of the DC nature of the magnetic source, this type of PIM reduction is broadband in nature, and thus not subject to the bandwidth limitations of some other proposed techniques.

Figure 6:
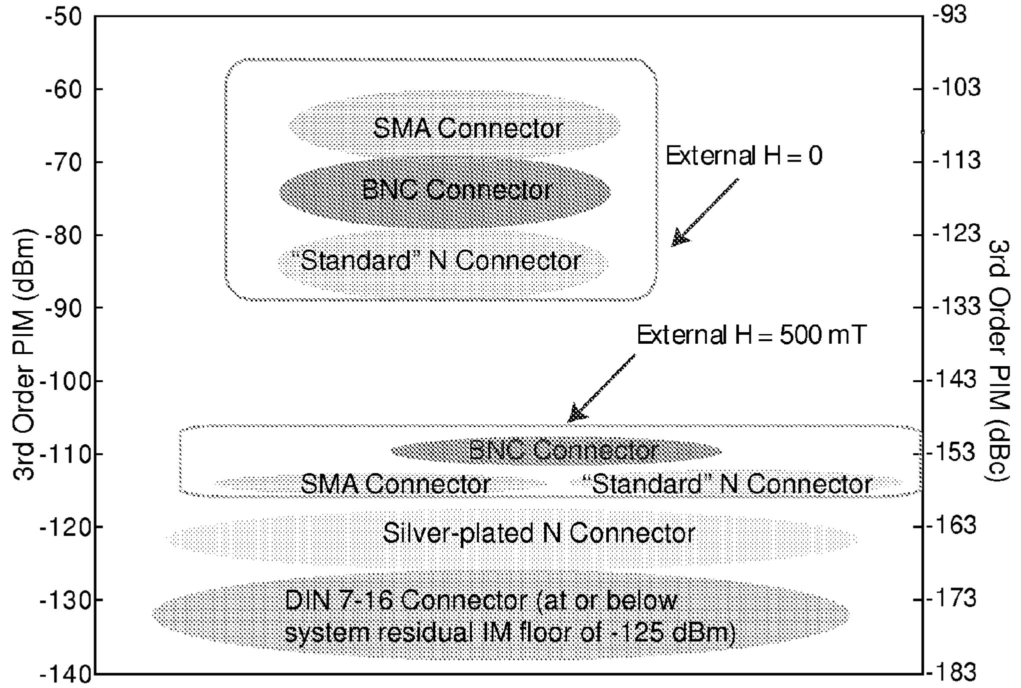
FIG. 6 illustrates the ranges of 3rd order intermodulation (IM) power output by different types of coaxial connections in a two-tone test with 2×43 dBm forward power. Shaded bands denote the range of the intermodulation generated by a connector family.

FIG. 6 compares the nominal PIM output of a variety of common coaxial connectors without an external magnetic field to their diminished PIM characteristic when subjected to a roughly 500 mT magnetic field. An interesting behavior shown in FIG. 6 is that with no external field, the larger-size connectors have better PIM characteristics. After the imposition of the external magnetic field, however, this general trend is no longer followed. Under an external B field of 500 mT, the SMA and N connectors had identical IM output at about −115 dBm. The BNC connector had about 5 dB more of IM. The PIM levels of the silver-plated N-type and 7-16 connectors, which do not contain ferromagnetic metals, were not affected by the application of an external magnetic field.

The prospect of using inexpensive, high-bandwidth SMA and 3.5 mm connectors in applications where previously only large, silver-plated connectors met design specifications is of interest for cost and performance reasons. Also, as shown in FIG. 5, in addition to reducing PIM output of components, the decrease in the sheet resistance of ferromagnetic metals as a result of the magneto-impedance effect could also yield marginal gains in the linear performance of the system. The present invention is applicable to varying degrees to other connectors in addition to ferromagnetic-containing SMA, BNC and N-type connectors, including but not limited to TNC, Type N, APC-7 and 2.4 mm connectors.

Figure 7:
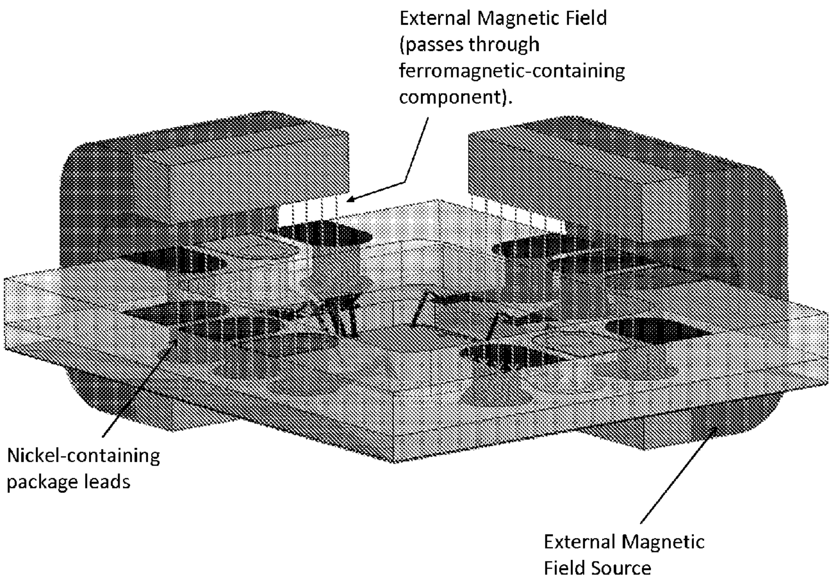
FIG. 7 depicts another embodiment of a magnetic PIM mitigation system according to the present invention, this embodiment having one or more permanent magnets or other magnetic field sources applied to nickel-containing package leads or other board-mounted components.

In addition to the various types of coaxial connectors made with ferromagnetic metals, the present invention is contemplated to be useful with antennas and RF filters among other passive RF system components, such as circuit boards with nickel-containing package leads, e.g., as depicted in FIG. 7. The magnetic PIM mitigation system passes an external magnetic field through the nickel-containing or other ferromagnetic package leads. The invention is also contemplated for use with nickel diffusion barriers and other nonlinear magnetic components used in communications and sensing systems.

Figure 8A:
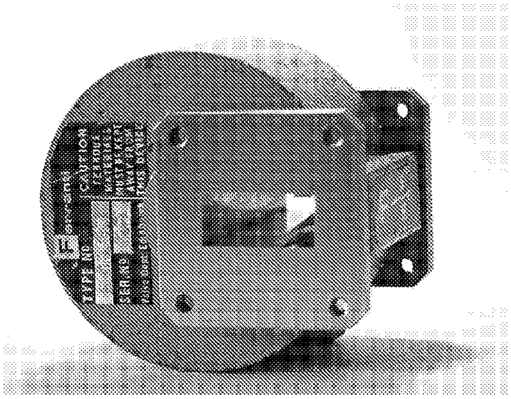
FIGS. 8 and 9 depict other embodiments of a magnetic PIM mitigation system according to the present invention.
Figure 8B:

Ferromagnetic metals are often included in high-power conduction paths and contribute to unwanted PIM generation. It is also contemplated as part of the present invention that magnetic fixtures may be fashioned to "bias" these ferromagnetic deposits as well, very similar to the gyromagnetic waveguide isolator shown in FIG. 8A. These magnetic fixtures may also take rather inexpensive forms, along the lines of refrigerator magnets as in FIG. 8B.

Figure 9:

Other embodiments of the present invention have the form of ferrite beads that are used on USB cables, shown in FIG. 9. Like ferrite beads, the PIM reduction magnets preferably simply snap onto the outside of coaxial connectors and other ferromagnetic-containing lengths of cable. The magnets may be shaped to conform to the outer shape of a coaxial connector, for example.

Thus, in various embodiments, the invention provides a magnetic field to reduce the passive intermodulation distortion produced by components containing ferromagnetic material. The introduction of a strong external magnetic field has been shown to reduce the passive intermodulation distortion produced by components containing ferromagnetic material by as much as 40 dB. This effect is useful both for mitigating passive intermodulation and for easily locating dominant sources of it, even in shielded components. A strong external magnetic field diminishes and linearizes the magnetic permeability of ferromagnetic metal, decreasing both the sheet resistance and inductance of the nickel-containing coaxial connectors described herein. Without being bound to a particular theory, the inventors note that inside ferromagnetics like nickel are millions of microscopic magnetic "domains," each with a random polarization. The inventors herein believe that an electric current passing through this metal dynamically re-orients these domains, causing a highly nonlinear response, and that the addition of a strong DC magnetic field to the material tends to "pin" the domains to a certain orientation, so that the electrical response of the material is linearized to a high degree, resulting in a substantial reduction of nonlinear distortion. The diminution of passive intermodulation power in response to the external magnetic field could be used as a non-invasive method of locating and mitigating the dominant ferromagnetic passive nonlinearities in high-powered systems, without disrupting the geometries of shielded structures such as coaxial transmission lines.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

We claim:

1. A magnetic field method for mitigating passive intermodulation distortion (PIM), comprising applying an external static magnetic field to a passive RF component which contains a ferromagnetic material and thereby reducing the intermodulation distortion produced by the passive RF component, wherein said static magnetic field is sufficiently strong to substantially saturate the magnetization of the ferromagnetic material in the RF component and reduce magnetic permeability of the passive RF component, and wherein the RF component is a nickel-containing package lead on an RF circuit board.

2. The method of claim 1, wherein said static magnetic field is produced by a permanent magnet.

3. The method of claim 2, wherein said static magnetic field magnetically biases the RF component.

4. The method of claim 2, wherein the permanent magnet is a neodymium rare-earth magnet.

* * * * *